Patented July 24, 1951

2,562,051

UNITED STATES PATENT OFFICE 2,562,051

PROCESS OF REACTING FURFURAL WITH MELAMINE-FORMALDEHYDE CONDENSATION PRODUCTS AND COMPOSITION OBTAINED THEREFROM

Richard Lindenfelser, Stamford, and Donald G. Patterson, Darien, Conn., assignors to American Cyanamid Company, New York, N. Y., a corporation of Maine No Drawing. Application June 3, 1947, Serial No. 752,291

4 Claims. (Cl. 260—67.6)

This invention relates to a process for the preparation of molding compounds and molding compositions obtained thereby. More specifically, this invention relates to the reaction, concentration and dehydration of the non-alkylated melamine-formaldehyde condensation product with furfural, whereby substantially all of the water therein is removed therefrom.

The exact nature of the reaction occurring with the process is not completely known. It is believed, however, that since furfural does not react readily with melamine, it functions as a dehydration agent permitting the removal of all the water from the resinous composition, and the retention of furfural therein, which may be partially reacted with the resin, or in solid solution with it. Upon curing at elevated temperature and pressure, the furfural completely reacts with the melamine-formaldehyde condensation process to provide clear infusible products with extremely high heat resistance and crack resistance. The characteristics of the molded product are believed to be derived from the fact that the dimensional stability is greatly enhanced by the relative absence of water and the reaction of the furfural with the melamine-formaldehyde condensation product.

Among the objects of this invention, therefore, is included not only the object to provide a process for obtaining a clear fusible resin, but also to provide a cured infusible resin having excellent heat resistance and crack resistance when cured.

The foregoing and other objects and advantages of this invention are attained by reacting at a pH of 8.5 to 11.5, and preferably 9.5 to 10.5 furfural with a melamine-formaldehyde condensation product, the furfural being added in an amount below 25% based on the total weight of resin solid, and preferably from about 3–15%; the resulting reaction mixture is concentrated, dehydrated, and dried. The resin may be compounded with fillers, colorants, lubricants, other resins and other additives, either prior to or subsequent to the drying stage. Greater quantities of furfural can be employed in the process, but it is unnecessary, as an amount above 25% is removed during the final stages of concentration. Lesser amount do not produce the desired results to as large an extent. It is also desirable to add the furfural during the concentration of the resin and near the end of the concentration to prevent loss of furfural due to distillation.

Although substantially any ratio of formaldehyde to melamine may be employed in effecting the original formaldehyde addition product, it is preferred to employ a mol ratio of from about 1.5 to about 3.5 mols of formaldehyde per mol of melamine, as addition or condensation products without the bounds of this range, do not give products comparable to those obtained within this preferred range.

The following examples in which the proportions are given in parts by weight, are given by way of illustration, in order to more fully describe the invention, and are not to be construed as limitations thereon.

Example 1

One hundred twenty-six (126) parts of melamine and 90 parts of formaldehyde in the form of a 37% aqueous solution, were added and were charged to a suitable reaction vessel and adjusted to a pH of about 8.1 with sodium hydroxide. This mixture was heated to reflux and held at that temperature until all of the melamine had dissolved. Refluxing was continued for a period of time sufficient to effect the completion of the addition reaction. The solution was then adjusted with sodium hydroxide to pH 10.0. 96 parts of furfural adjusted with calcium oxide to pH 10.0 and filtered was added thereto, and thoroughly mixed therewith with mechanical agitation. The reaction mixture was then dehydrated under a vacuum of 26 inches of mercury. Distillation was continued until substantially all of the water calculated in the mixture had been distilled over, at which time the temperature had increased to 115° C.. The resin was removed from the kettle. The product had a set time of 3 minutes at 150° C. An analysis of the distillate indicated that substantially all of the water in the reaction mixture had been removed, and approximately 8% of the resin constituted furfural.

Example 2

To a trimethylol melamine syrup at a pH of 9.5, there was added one molecular equivalent of furfural per molecular equivalent of melamine. The furfural had previously been adjusted with ammonium hydroxide to pH 9.5. The resultant reaction mixture held for 75 minutes at reflux, and thereafter concentrated and dehydrated by vacuum distillation at a vacuum of 60 cm. of mercury, until the resin temperature had risen to 85° C. Substantially all of the calculated water in the reaction mixture had been removed during the dehydration period of 110 minutes. The vacuum was released, and the resin removed from the reaction vessel. An analysis of the distillate indicated that 16% of the resin was furfural. The resin set at 150° C. in 1½ minutes.

*Example 3*

To a melamine-formaldehyde reaction product syrup obtained by reacting 2 mols of formaldehyde per mol of melamine, and adjusted to pH 10.0, there was added 1 mol of furfural per mol of melamine. The furfural had previously been adjusted with ammonium hydroxide to pH 10.0. The mixture was held for 45 minutes at reflux, and it was then concentrated and dehydrated by vacuum distillation at a vacuum of 60 cm. of mercury. It took approximately 75 minutes for substantially all of the water present in the reaction mixture to be distilled over, and the final resin temperature was 80° C. The vacuum was released, and the resin removed from the reaction vessel. The resin set at 150° C. in 2 minutes.

*Example 4*

To a dimethylol melamine syrup which had been adjusted to pH 10.0, there was added 1 mol of neutralized furfural per mol of melamine. The mixture was vacuum dehydrated under a vacuum of 67 cm. of mercury for 45 minutes; and the final resin temperature was 120° C. The vacuum was released and the resin removed from the reaction vessel. The resin set in 1½ minutes at 150° C. An analysis of the distillate indicated that furfural constituted 20% of the resin.

*Example 5*

During the concentration, at 52 cm. of mercury vacuum, of a resinous syrup obtained by reacting 60 parts of formaldehyde and 126 parts of melamine, adjusted to pH 10.0, there was added 9.8 parts of furfural adjusted to pH 10, when the temperature reached 100° C. Concentration and dehydration was continued for 80 minutes at a vacuum of 68 cm. of mercury until the resin temperature was 115° C., and vacuum 68 cm. of mercury. Substantially all of the water calculated present had been removed at this time. This resin set at 150° C. in 1 minute, and contained 3% of furfural based on the weight of resin.

This experiment was repeated with the exception that 20.6 parts of furfural was added when the temperature had reached 100° C. with a vacuum of 52 cm. of mercury; and the final conditions of concentration were 112° C. at 50 cm. of mercury vacuum. This resin set in 2 minutes at 150° C., and had 7% furfural as a constituent thereof.

Both phases of this example, that is, using 5% furfural and 10% furfural, were repeated by adding the furfural at various stages of the concentration and dehydration. Characteristics within the allowable limits of experimental error were obtained in substantially all cases, with optimum results being obtained when furfural was added near the completion of concentration.

*Example 6*

To a dimethylol melamine resinous syrup adjusted in pH to 9.5, obtained by reacting 2 mols of formaldehyde per mol of melamine, there was added 20% furfural adjusted to pH 9.5, the percent furfural being based on the solids weight of the dimethylol melamine-furfural. This dimethylol melamine-furfural mixture was concentrated at a vacuum of 68 cm. of mercury for 85 minutes, to a final resin temperature of 120° C., at which time all of the water calculated present in the mixture had been removed. An analysis of the distillate indicated that 12% furfural was present in the resin.

This experiment was repeated with the exception that the furfural was added after partial concentration of the dimethylol resin solution at a vacuum of 52 cm. of mercury. When the temperature during the concentration reached 100° C., the furfural was added and dehydration continued to a final resin temperature of 115° C. and 67 cm. of mercury vacuum. The resin obtained in this manner was comparable with that obtained when the furfural was added at the beginning of the concentration of the dimethylol melamine resin.

As noted by the examples given hereinabove, all of the examples illustrate operating at a pH above 8.5 and preferably between 9.5 and 10.3. This is necessary in order to obtain thorough mixing and solution of furfural. Lower pH's cause the melamine resin to cure prior to thorough mixing and solution of the furfural.

These resins may be molded with or without other additives such as fillers, colorants and the like, by compression molding at 150°–155° C. for approximately 7 minutes. As indicative of the characteristics obtained when these resins are used as molding compositions in conjunction with 55% of a filler composed of 75% calcined asbestos, 25% cotton flock, molded articles from this composition have the following typical physical properties:

Flexural strength—11700–12900 p. s. i.

Isod impact strength .309–.390 ft. lbs./in.

Shrinkage cold mold to cold piece 4.6–5.3 mils/in.

Shrinkage on ageing (8 hrs. at 104° C.) 1.8–2.1 mils/in.

Arc resistance of 147–184 seconds A. S. T. M.

This invention gives a product in which its advantages include high mechanical strength and good heat resistance. It therefore has good properties for industrial applications, especially in the production of molded articles possessing a low degree of shrinkage, and extremely high resistance to heat and cracking, and having excellent physical properties.

In addition to permitting a higher degree of dehydration and permitting the dehydration to be effected at higher temperatures and higher vacuums, the furfural also appears to serve as a flow plasticizer, because the processing properties of the melamine-formaldehyde resin is greatly enhanced, and it has an additional advantage over commercial plasticizers, because it reacts with the resin when molded under heat and pressure, so that no bleeding occurs on ageing molded pieces.

We claim:

1. A process for preparing a vacuum dehydrated moldable resin comprising vacuum dehydrating a melamine-formaldehyde resin syrup under a vacuum of 52 cm. until a temperature of 100° C. is reached, adding thereto 3%–15% by weight of furfural, continuing the vacuum dehydration under a pH of 8.5 to 11.5 under a vacuum of 50–68 cm. until a temperature of 112–120° C. is reached, wherein the melamine-formaldehyde resin has a mol ratio of 1:1.5 to 1:3.5, respectively.

2. A process for preparing a vacuum dehydrated moldable resin comprising vacuum dehydrating a melamine-formaldehyde resin syrup under a vacuum of 52 cm. until a temperature of 100° C. is reached, adding thereto 3%–15% by weight of furfural, continuing the vacuum dehydration under a pH of 9.5 to 10.5 under a vacuum of 50–68 cm. until a temperature of 112–120° C. is reached, wherein the melamine-formaldehyde resin has a mol ratio of 1:1.5 to 1:3.5, respectively.

3. The product produced according to the process of claim 1.

4. The product produced according to the process of claim 2.

RICHARD LINDENFELSER.
DONALD G. PATTERSON.

REFERENCES CITED

The following references are of record in the file of this patent:

UNITED STATES PATENTS

| Number | Name | Date |
|---|---|---|
| 2,197,357 | Widmer | Apr. 16, 1940 |
| 2,209,292 | Berger (1) | July 23, 1940 |
| 2,368,451 | D'Alelio | Jan. 30, 1945 |
| 2,388,143 | Harris | Oct. 30, 1945 |

FOREIGN PATENTS

| Number | Country | Date |
|---|---|---|
| 412,373 | Canada | May 11, 1943 |